(12) United States Patent
Osborne

(10) Patent No.: US 6,789,561 B2
(45) Date of Patent: Sep. 14, 2004

(54) EXCESS-FLOW VALVE

(76) Inventor: Graham William Osborne, Neaches Farm, Felmingham, North Walsham (GB), NR28 0JX ( * ) Notice: Subject to any disclaimer, the term of this patent is extended or adjusted under 35 U.S.C. 154(b) by 0 days.

(21) Appl. No.: 10/343,256

(22) PCT Filed: Jul. 27, 2001

(86) PCT No.: PCT/GB01/03405
§ 371 (c)(1),
(2), (4) Date: Mar. 4, 2003

(87) PCT Pub. No.: WO02/12762
PCT Pub. Date: Feb. 14, 2002

(65) Prior Publication Data
US 2003/0159730 A1 Aug. 28, 2003

(30) Foreign Application Priority Data
Aug. 3, 2000 (GB) .............................. 0018911

(51) Int. Cl.[7] .......................... F16K 17/34; F16K 17/40
(52) U.S. Cl. ...................... 137/71; 137/512.3; 137/460; 137/498; 137/521; 137/517; 137/68.14; 251/58; 251/66; 251/89
(58) Field of Search ........................ 137/39, 67, 68.11, 137/68.14, 71, 460, 498, 512.3, 517, 521, 797; 251/58, 66, 67, 89

(56) References Cited

U.S. PATENT DOCUMENTS

| | | | | |
|---|---|---|---|---|
| 3,035,595 A | * | 5/1962 | Beason, Jr. | 137/71 |
| 3,489,160 A | * | 1/1970 | Moore | 137/39 |
| 3,542,047 A | * | 11/1970 | Nelson | 137/68.15 |
| 4,483,359 A | * | 11/1984 | Robertson | 137/68.15 |
| 5,004,010 A | * | 4/1991 | Huet | 137/513.3 |
| 5,099,870 A | * | 3/1992 | Moore et al. | 137/71 |
| 5,244,006 A | * | 9/1993 | Pettesch | 137/71 |
| 6,041,762 A | * | 3/2000 | Sirosh et al. | 123/529 |
| 6,062,247 A | * | 5/2000 | King, Sr. | 137/71 |
| 6,135,134 A | * | 10/2000 | Taylor | 137/68.11 |

FOREIGN PATENT DOCUMENTS

WO    WO 96 17191    * 6/1996

OTHER PUBLICATIONS

International Search Report on the corresponidng PCT application PCT/GB 01/03405; Oct. 2001.*
International Preliminary Examination Report on the corresponding PCT application PCT/GB 01/03405; Apr. 2002.*

* cited by examiner

Primary Examiner—Ramesh Krishnamurthy
(74) Attorney, Agent, or Firm—Andrus, Sceales, Starke & Sawall, LLP

(57) ABSTRACT

An automatically operating valve for use for example in a forecourt fuel pump has a body (10) defining a flow passage (20) within which is formed a valve seat (22), the body having a weakened zone (16) around the flow passage (20) such that an impact on the body will fracture the body at the weakened zone. A valve member (30) is mounted for movement within the flow passage (20) and is engageable with the valve seat (22) to close the valve. A closing mechanism effects movement of the valve member (30) to its closed position in the event that the body (10) is fractured at the weakened zone. Further, the valve member (30) is configured to move to its closed position under the influence of excessive flow of liquid through the flow passage (20).

17 Claims, 7 Drawing Sheets

EXCESS-FLOW VALVE

CROSS-REFERENCE TO RELATED APPLICATIONS

This application is the U.S. national stage application of International Application PCT/GB01/03405, filed Jul. 27, 2001, which international application was published on Feb. 14, 2002 as International Publication WO 02/12762 in the English language. The International Application claims priority of Great Britain Patent Application 0018911.8, filed Aug. 3, 2000.

This invention relates to an automatically-operating valve intended to close off a flow passage through the valve in the event that the valve is subjected to a significant impact. In particular, but not exclusively, the invention concerns a valve for use in connection with the mounting of a forecourt liquid fuel dispensing pump on to a supporting base.

Fuel pumps for dispensing petrol or diesel fuel into the tank of a motor vehicle generally comprise a self-contained unit mounted on a base or plinth on a garage forecourt, the pump being connected by way of a pipeline to an underground storage tank from which the fuel is drawn during operation of the pump. Some fuel pumps operate simply by suction, so that there is a sub-atmospheric pressure in the pipe from the underground tank to the pump, whenever the pump is in operation. Other installations employ a pressure-feed system where fuel in the pipeline from the tank to the pump is under pressure, to ensure a uniform delivery of fuel to the pump. A pressure-feed system is usually employed when there is a relatively long pipeline from the underground tank to the pump.

Not infrequently, vehicles manoeuvring on a garage forecourt collide with a fuel pump and displace the pump from its proper position on its base or plinth. In order to prevent significant fuel spillage (which could be most substantial in the case of a pressure-feed system) it is the usual practice to fit a shear valve in the pipeline delivering fuel to the pump, in the vicinity of the mounting of the pump on to the base or plinth. A basic example of such a shear valve is shown in U.S. Pat. No. 3,489,160 and a much improved form in WO 96/17191. In both these prior valves, there is a weakened zone in the valve body so that if the pump is subjected to a lateral displacement, the valve will shear across its weakened zone. An automatically-operating valve member provided within the shear valve then closes the delivery pipeline to prevent leakage of fuel. In the improved valve of WO 96/17191, operation of the valve member is controlled by a relatively weak frangible link, so that even a minor impact insufficient to displace the fuel pump from its normal position but still sufficient to crack the valve body about its weakened zone will break the frangible link and so cause the valve to close.

Though the improved valve of WO 96/17191 greatly increases safety on forecourt installations and can minimise environmental damage, nevertheless it is still possible for damage to occur to a fuel pump which does not move the pump with respect to its base or plinth and so which does not break the shear valve so causing the valve to close, but which does still allow liquid fuel to escape. For example, when the pump is operating a flexible hose connecting the pump to a delivery nozzle could become damaged or even torn away from the pump, allowing a sudden and excessive outflow of fuel. In addition, component parts of the pump mechanism itself could fail, so allowing an excessive outflow of fuel.

It is a principal aim of the present invention to address the above described problem and so to provide a valve which is capable of operating to close a flow passage therethrough in the event that a problem arises which, if not addressed, would allow excessive outflow of liquid downstream of the valve.

According to the present invention, there is provided a valve having a body defining a flow passage within which is formed a valve seat, the valve body having a weakened zone around the flow passage whereby an impact may fracture the body at the weakened zone, a valve member engageable with the valve seat and movable within the flow passage to open and close the valve, and closing means to effect movement of the valve member to close the valve upon the valve body being fractured at the weakened zone, the valve member being arranged to move to its closed position under the influence of excessive flow though the flow passage.

The valve of this invention will hereinafter further be described particularly with reference to its intended use with a forecourt liquid fuel pump, though the invention is not to be regarded as limited to that use and may be employed in other industries—for example, in a chemical manufacturing plant.

The valve of the present invention operates on an automatic basis, to close the flow passage through the valve body in the event that an impact on the valve fractures the body around its weakened zone. In this respect, the valve may be similarly arranged to those described in U.S. Pat. No. 3,489,160 or WO 96/17191. However, in addition the valve member is arranged to move to its closed position, so as to close the passage through the housing, in the event that the liquid flow rate through the valve exceeds a pre-set value. Thus, should some problem arise with the fuel pump so allowing the outflow of fuel but which nevertheless does not break the housing at its weakened zone, the valve will still close and thus prevent further outflow of liquid.

Movement of the valve member to its closed position under the influence of excessive flow could be achieved in a number of different ways. For example, it would be possible to provide a flow rate monitor (such as an impeller) the output of which is used to control an actuator associated with the valve member so as to close the valve when an excessive flow rate occurs. The preferred arrangement is for the valve member directly to be closed by an excessive liquid flow rate, by appropriate configuration of the valve member and its associated components mounting the valve member within the passage. For example, a spring may be provided which biases the valve member to its open position and the valve member partially obstructs the flow passage when the valve member is in its open position, such that flow past the valve member in the direction of closing movement thereof exerts a force on the valve member tending to close the valve against the action of said spring. In one embodiment, the valve member and seat are in the form of a poppet valve with the valve member mounted for sliding movement towards and away from the valve seat. Then, by appropriately configuring the head of the poppet valve member, increasing flow rates may exert increasing forces on the valve member so as gradually to move the valve member against the action of the spring until the valve is closed.

For such an arrangement, the closing means (which effects movement of the valve member in the event of fracturing of the body) may include a lever external to and pivoted to the valve body and which is released on fracturing of the body. Such a lever may be connected to a cam internally of the flow passage, the cam being configured to move the valve member to its closed position against the action of the spring, on pivoting movement of the lever.

An alternative arrangement to a sliding poppet valve is for the valve to be in the form of a flap valve having a valve member which hinges within the passage, to co-operate with the valve seat when in its closed position. Such a valve member should be associated with a spring to bias the valve member to its open position. Again, by having the valve member partially obstructing the flow passage when the valve is open and by appropriate configuration of the valve member, increasing flow through the passage will exert a closing force on the plate, so moving the plate against the action of the spring until the valve eventually closes.

As with the arrangement employing a poppet valve, the closing means for effecting movement of the valve member to its closed position on fracturing of the valve body may include a lever external to and pivoted to the body and which lever is released on fracturing of the valve body. Such a lever may be connected to the flap valve member internally of the flow passage, to effect closing movement thereof. Conveniently, the arm carrying the valve member is mounted for pivoting movement about the same axis as that of the lever; in this case, a spring-loaded toggle mechanism may interconnect the lever and the arm, whereby movement of the lever through an over-centre position of the toggle mechanism will drive the flap valve member to its closed position. The spring of such a toggle mechanism may also serve to bias the valve member to its open position prior to fracture of the valve body and so prior to releasing the lever, whereby the arm may move the valve plate to its closed position under excessive flow conditions against the action of that spring of the toggle mechanism.

In either case described above, there may be a second spring which urges the lever of the closing means to a second position where the valve is closed, from a first position where the valve is open but the valve member is free to move under excessive flow conditions. The lever is normally held in said first position by a release mechanism which frees the lever should the valve body break at its weakened zone. Such a release mechanism may be substantially as described in WO 96/17191, where a frangible link bridges the weakened zone of the valve body and which link breaks to free the lever in the event that the valve body fractures at its weakened zone.

The valve of this invention may be provided with a second valve seat within the flow passage on the other side of the weakened zone with respect to the first-mentioned valve seat, there being a second valve member mounted to co-operate with that second valve seat. Such a second valve member and seat may form a simple non-return valve which is arranged to close under no-flow or reverse flow conditions, having regard to the normal intended flow direction through the valve. In the alternative, the second valve seat and member may be of a similar construction and arrangement to the first-mentioned valve seat and member, but acting in the opposite sense with respect to the first-mentioned valve seat and member. In this case, both valves will be closed in the event that the valve body fractures about its weakened zone, so preventing leakage of fuel from the fuel pump, as well as from the pipeline supplying the pump, in the event that the valve body is subjected to an impact sufficient to fracture the housing.

By way of example only, two specific embodiments of valve of this invention will now be described in detail, reference being made to the accompanying drawings, in which.

Figure 1:
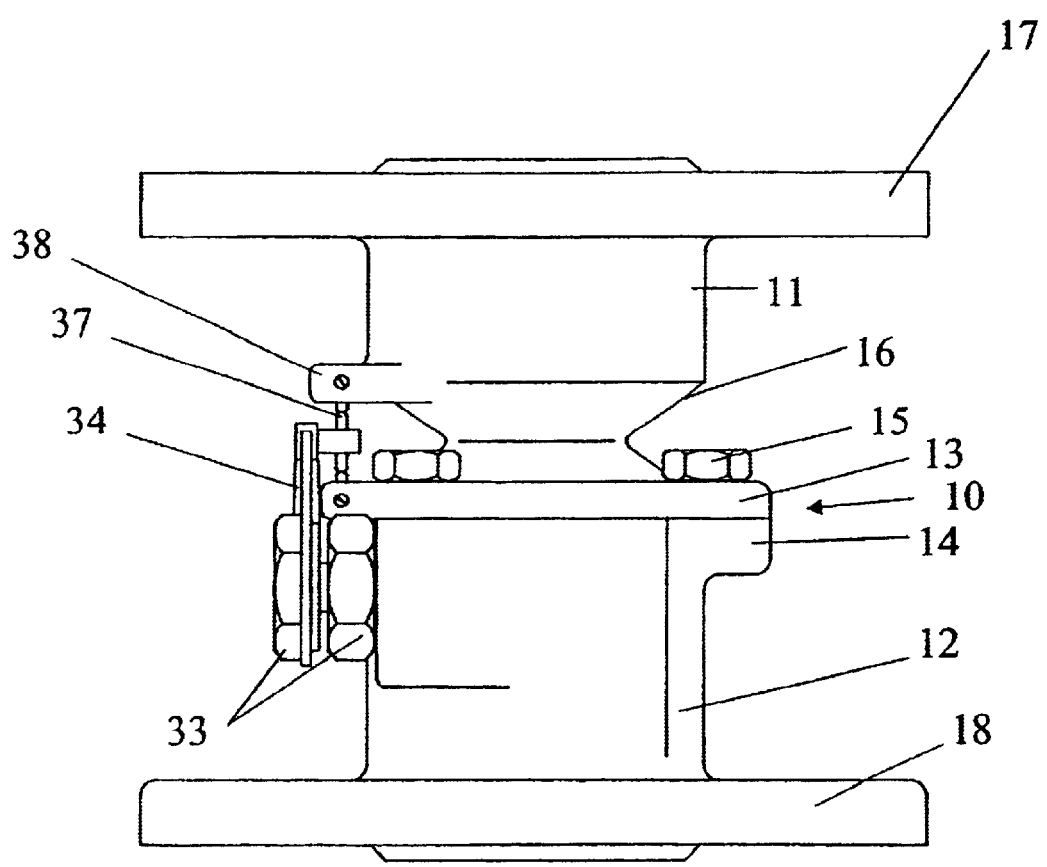
FIG. 1 is a side view on the first embodiment.

Referring initially to FIGS. 1 to 4, there is shown a valve having a body 10 assembled from first and second body parts 11 and 12 secured together at mating flanges 13 and 14 respectively by bolts 15. Part 11 has an encircling V-shaped groove 16 formed therein adjacent its flange 13, so as to provide a weakened zone of considerably lesser strength than the remainder of the body parts 11 and 12; an impact on the body 10 or on pipe work or other structures connected to the body will therefore tend to fracture the body about the groove 16, rather than cause other damage, elsewhere. The opposed free ends of the body parts 11 and 12 are provided with respective mounting flanges 17 and 18, to permit the valve to be assembled in a pipeline in a conventional manner.

A flow passage 20 is formed through the body 10, part 11 of the body providing a valve seat 21 within that passage, adjacent groove 16. Body part 12 provides a valve seat 22 in the flow passage, adjacent its flange 14.

A spider 24 is mounted within the passage 20 in body part 11 and is held in place by a circlip 25, the spider having a central boss 26 within which is slidably mounted a valve stem 27 carrying a valve plate 28 at the end thereof nearest body part 12. A spring 29 serves to urge the valve plate 28 into engagement with valve seat 21, so as to maintain the valve closed unless lifted by liquid flow in the direction of arrow D shown on the drawings. The valve formed by plate 28 co-operating with seat 21 thus forms a unidirectional (or non-return) valve.

In body part 12, there is provided a flap valve comprising a valve member 30 articulated to an arm 31 pivoted to a shaft 32 journalled in part 12 and extending out of the passage 20. Secured to a square section of that shaft 22 by nuts 33 is a lever 34 carrying at its free end a pin 35. A spring 36 encircles the shaft 32 and is arranged to bias the lever 34 in a counter-clockwise sense, in FIGS. 2 to 4. Movement of the lever in that sense is restrained by a frangible link 37 clamped to lugs 38 provided on body part 11 to each side of the V-shaped groove 16. Such a frangible link 37 may be a glass tube or rod, or of some other readily-breakable material. Further, that link 37 may be provided with score marks or other weakening as shown in FIG. 1, so as to ensure ready breaking of the link.

Within the flow passage in body part 12, a control plate 39 is secured to the shaft 32, for rotation therewith. A telescopic link 40 interconnects the control plate 39 and arm 31, a compression spring 41 being provided around that link 40 in order to urge apart the control plate 39 and arm 31. The arrangement of the control plate 39, arm 31, link 40 and spring 41 form a toggle mechanism, which goes over-centre on rotational movement of the plate 39 thereby to urge the arm 31 either clockwise or counter-clockwise, depending upon the position of the control plate 39. A screw-threaded adjuster 42 passes through the body part 12, in order to limit counter-clockwise rotational movement of arm 31 under the action of compression spring 41, as shown in FIG. 2.

Figure 2:
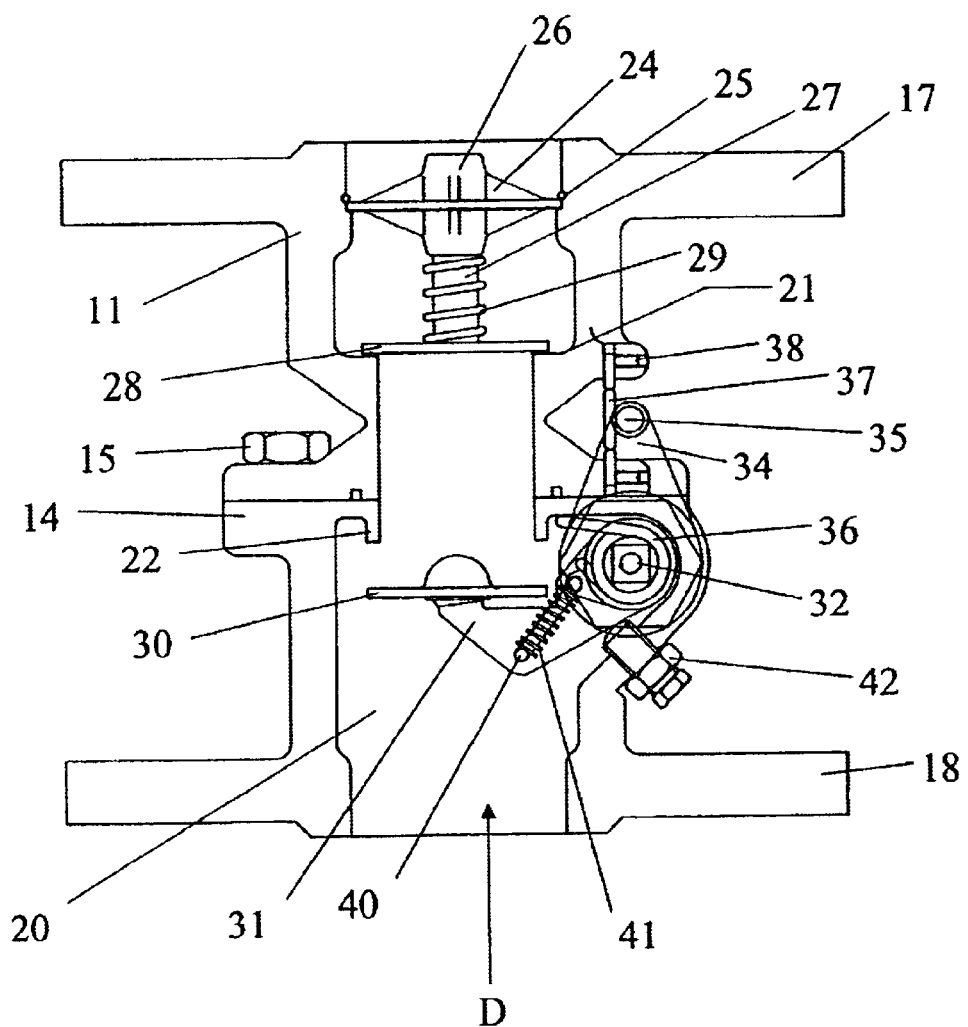
FIGS. 2, 3 and 4 are diagrammatic sectional views through the valve of FIG. 1, taken on line A—A marked on FIG. 1 and showing the valve set respectively for normal operation, when closed following fracture of the valve body and when closed by excessive flow through the valve.
Figure 3:
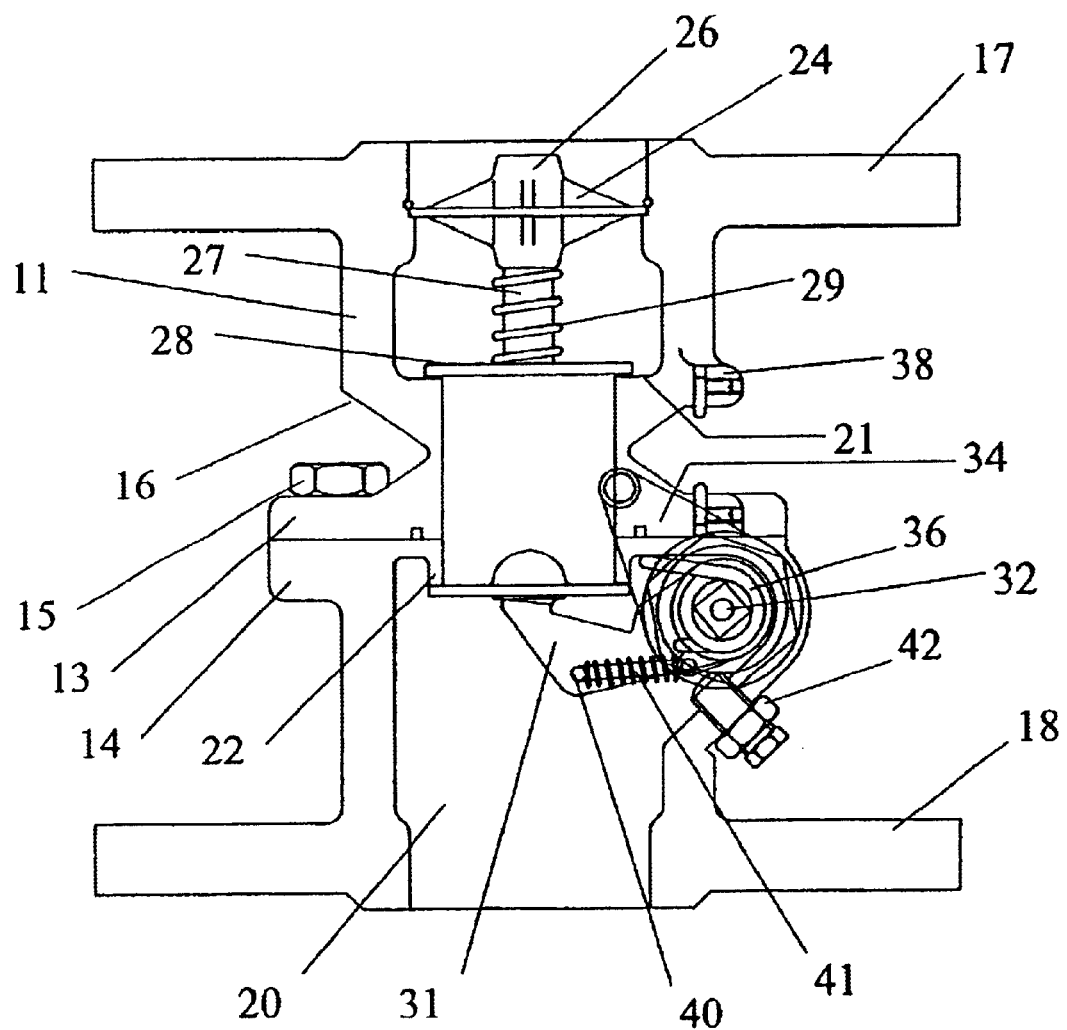

The normal setting of the valve is shown in FIG. 2. Here, flow may occur through the valve in the direction of arrow D, valve plate 28 lifting under the action of spring 29 in order to allow such flow to occur. Should the valve body 10 be subjected to an impact allowing the body part 11 to fracture in the region of groove 16, the frangible link 37 will break so permitting lever 34 to move in a counter-clockwise direction as shown in FIG. 3. This takes the compression spring 41 of the toggle mechanism over centre so that arm 31 is driven in a clockwise sense by the spring 41, moving the valve member 30 to its closed position as shown in FIG. 3. If, at this time, there is flow through the valve in the direction of arrow D, that flow will be cut off and simultaneously valve plate 28 will close the unidirectional valve in body part 11, so closing off all out-flow of liquid through the broken body part 11.

Figure 4:
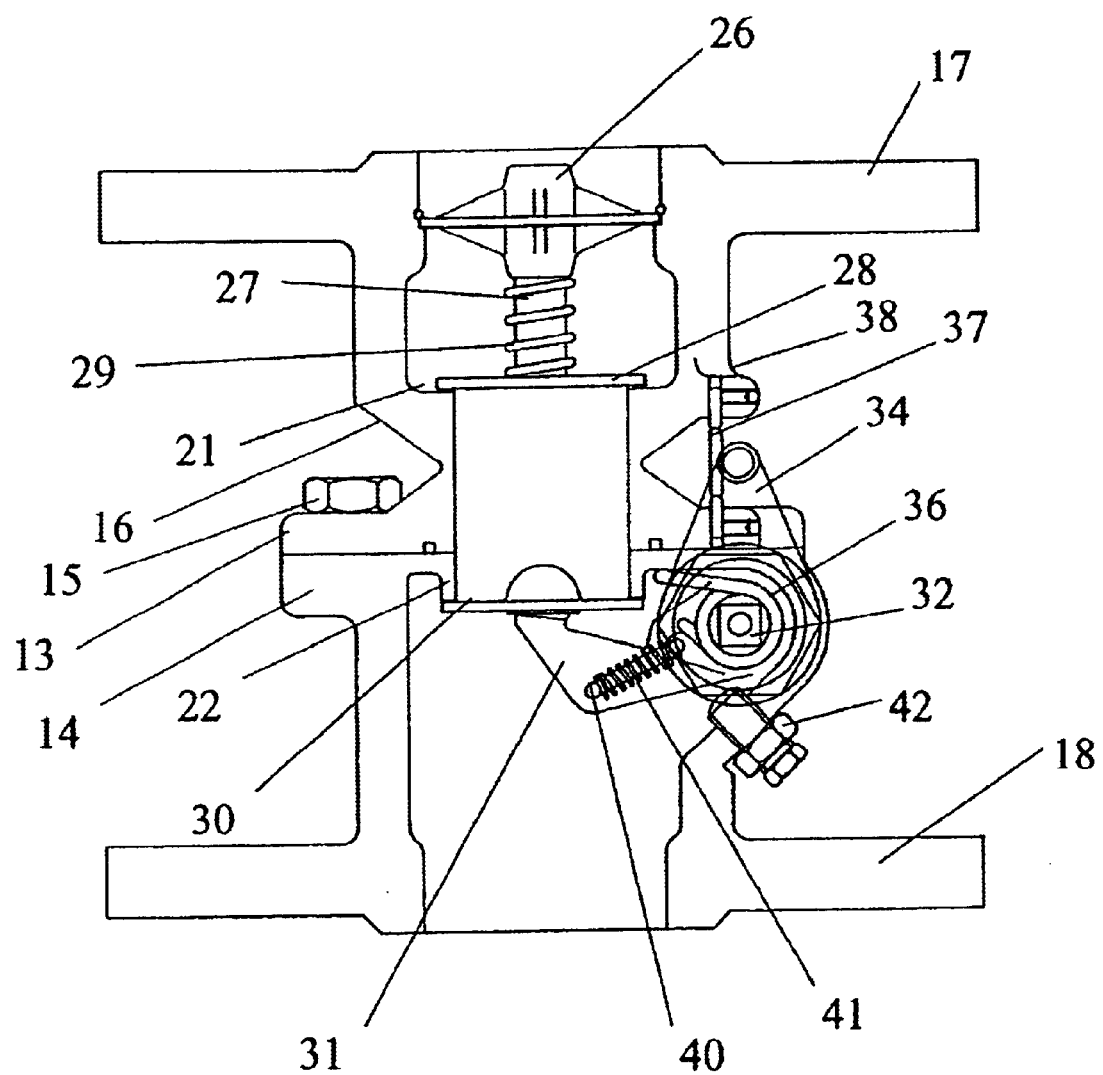

Should some other failure elsewhere in a system give rise to an excessive flow rate in the direction of arrow D through the valve, the valve member 30 will be moved by that flow rate to the position shown in FIG. 4, by causing clockwise pivoting action of the arm 31 against the force provided by the compression spring 41. This will close the flow passage 20 through the valve and so the valve plate 28 of the unidirectional valve also will close, as shown in FIG. 4.

Figure 5:
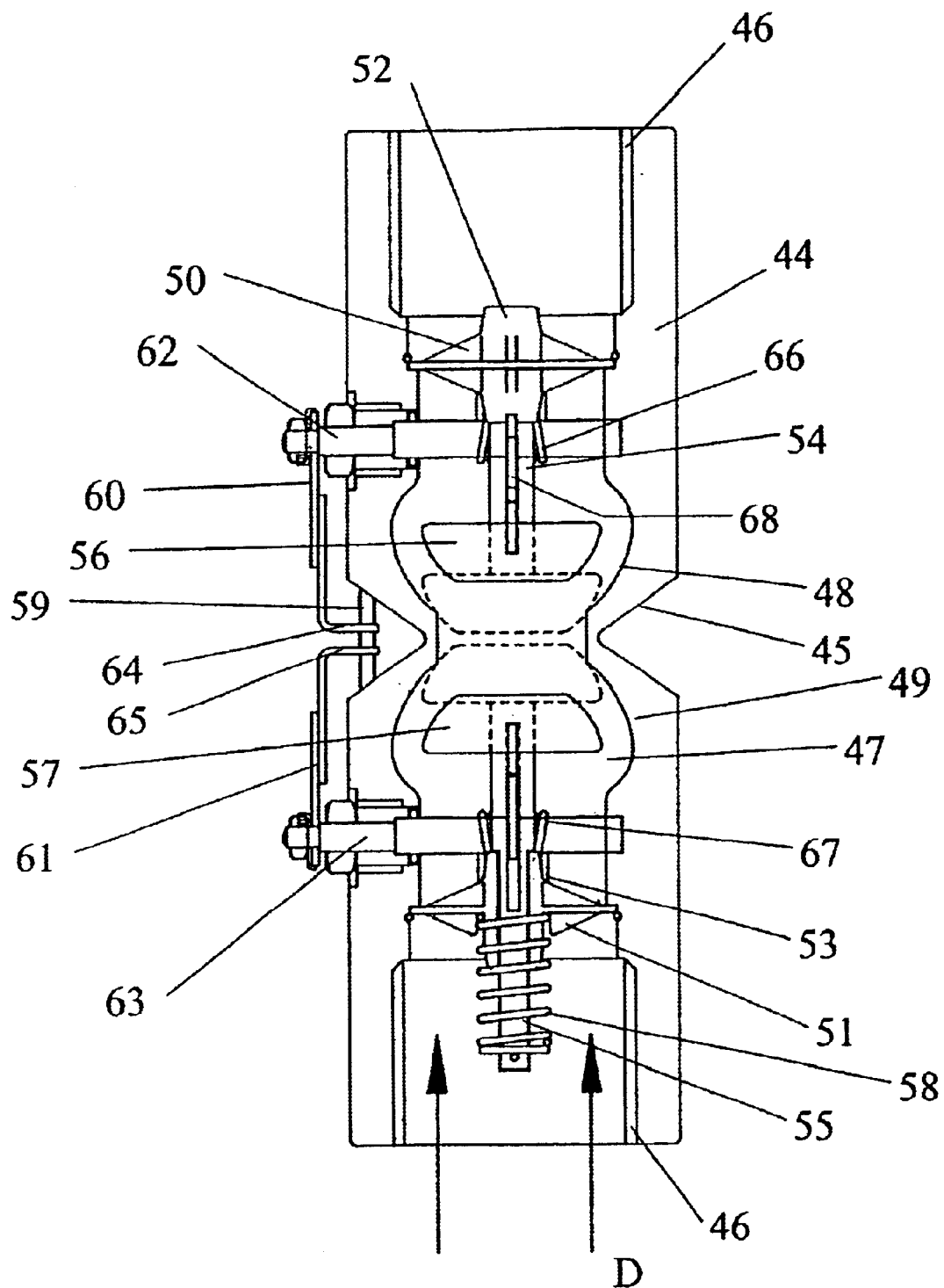
FIGS. 5 and 6 are diagrammatic sectional views through the second embodiment of valve of this invention, taken at 90° to each other.
Figure 6:
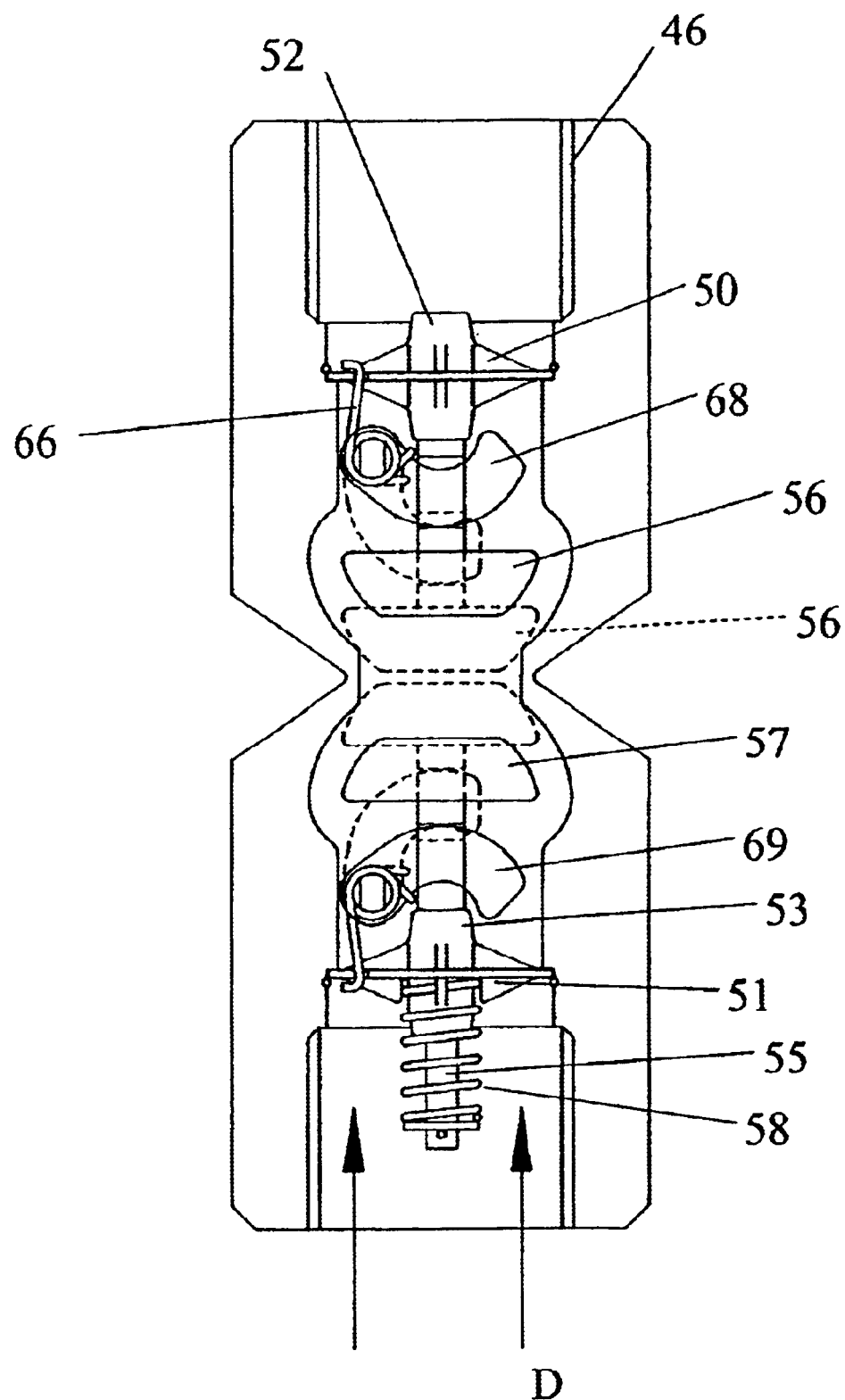
Figure 7:
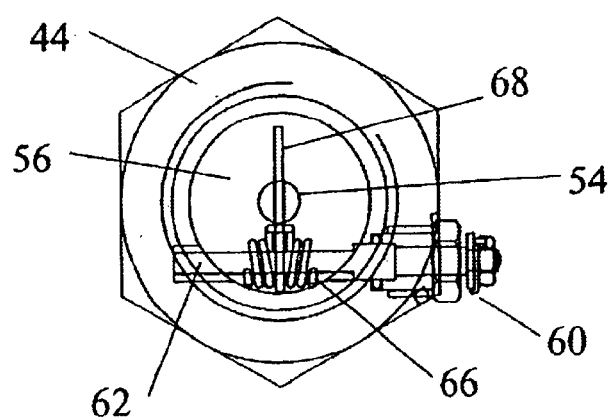
FIG. 7 is an end view on the valve of FIGS. 5 and 6.

FIGS. 5 to 7 show a second embodiment of valve, comprising a one-piece valve body 44 having a V-shaped groove 45 formed mid-way between the valve body end faces, the arrangement being such that an impact on the body or associated pipe work or other structures will tend to fracture the body in the region of the groove 45. Internally of the valve body is a flow passage 47 internally threaded at the outer end portions 46 to permit the mounting of the valve in a pipeline. To each side of the groove 45, that flow passage is provided with respective valve seats 48 and 49. Spiders 50 and 51 are mounted in the flow passage adjacent the threaded end portions 46, which spiders are secured in position by circlips. Each spider provides a central boss 52,53 in which is slidably mounted a respective valve stem 54,55 each stem having a valve head in the form of an associated poppet valve member 56,57. A spring 58 is associated with valve stem 54, in order to urge the valve member 56 spaced from its associated seat 48, as shown in FIGS. 5 and 6 in solid lines.

Externally of the body, the groove 45 is bridged by a frangible link 59, which may be similar to link 37 described above. A pair of levers 60 and 61 are carried on respective shafts 62 and 63 journalled in the body to extend into the flow passage 20 through the body. The levers 60,61 have respective end portions 64,65, turned to bear on the link 59, each shaft 62,63 having an associated spring 66,67 provided internally of the flow passage and arranged to urge the lever in the appropriate sense to bear on the link 59. Within the flow passage, each shaft 62,63 carries a respective cam 68,69 which extends through a slot in the respective valve stem 54,55 whereby turning movement of a cam will move the associated valve member 56,57 to its closed position, engaged with the respective valve seat 48,49.

The slot in valve stem 54 has an axial length just sufficient to accommodate its associated cam 68 and permit turning movement of that cam so as to move the valve member 56 between its open and closed positions. By contrast, the axial length of the slot in valve stem 55 is significantly greater and extends back towards the boss 53 which carries the stem 55. This permits the associated valve member 57 to move towards its seat 49 under the action of an excessive flow rate through the valve in the direction of arrow D, the valve member 57 moving against the action of spring 58. On the other hand, rotation of the cam 69 will positively drive the valve member 57 to engage its seat 49 by virtue of the inter-engagement of the cam with the end of the slot nearest the valve member 57.

The valve of FIGS. 5 to 7 operates in an essentially similar manner to that of FIGS. 1 to 4, except that no unidirectional valve is provided. Rather, with the valve of FIGS. 5 to 7, the flow passage will positively be closed by both valve members 56,57 moving to their closed positions on fracturing of the valve, by virtue of the springs 66,67.

Figure 8:
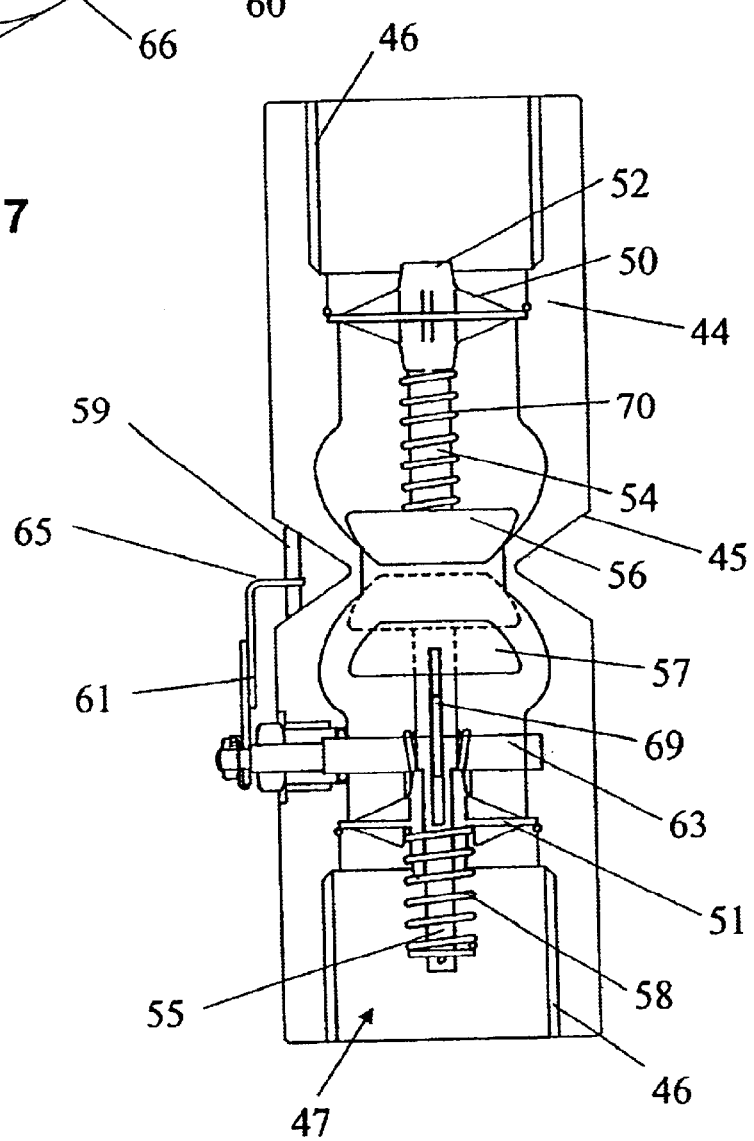
FIG. 8 is a diagrammatic sectional view through a simplified form of the valve of FIGS. 5 to 7.

FIG. 8 is a simplified form of the valve of FIGS. 5 to 7. Here, no cam closing mechanism is provided for valve member 56. Rather, a compression spring 70 surrounds valve stem 54 urging the valve member 56 to its closed position engaged with seat 48, so that the valve operates as a simple unidirectional valve, similar to that described with reference to FIGS. 1 to 4. Poppet valve member 57 together with its valve stem 55, cam 69, shaft 63 and lever 61 are all as described above with reference to FIGS. 5 to 7 and will not be described again here.

What is claimed is:

1. An automatically-operating valve having:
    a body defining a flow passage, a valve seat provided within the flow passage, and a weakened zone formed in the valve body around the flow passage whereby an impact on the valve body may fracture the valve body at the weakened zone;
    a valve member engageable with the valve seat and movable within the flow passage to open and close the valve; and
    closing means to effect movement of the valve member to close the valve upon the valve body being fractured at the weakened zone;
    the valve member being arranged to move to its closed position under the influence of excessive flow though the flow passage.

2. A valve as claimed in claim 1, wherein there is a spring which biases the valve member to its open position.

3. A valve as claimed in claim 2, wherein the valve member partially obstructs the flow passage when the valve member is in its open position, whereby flow past the valve member in the direction of closing movement of the valve member exerts a force on the valve member tending to close the valve against the action of said spring.

4. A valve as claimed in claim 2, wherein the valve member and seat are in the form of a poppet valve with the valve member mounted for sliding movement towards and away from the valve seat.

5. A valve as claimed in claim 4, wherein the closing means for the valve member comprises a lever external to and pivoted to the valve body which lever is connected to a cam internally of said flow passage, the cam being configured to move the valve member to its closed position against the action of the spring on pivoting movement of the lever.

6. A valve as claimed in claim 2, wherein the valve is in the form of a flap valve having a valve member which co-operates with the valve seat when in its closed position, the valve member being mounted within the flow passage for pivoting movement with respect to the valve body.

7. A valve as claimed in claim 6, wherein said closing means comprises a lever external to and pivoted to the valve body which lever is connected to the valve member internally of said flow passage whereby the valve member is moved to its closed position against the action of the spring on pivoting movement of the lever.

8. A valve as claimed in claim 7, wherein the valve member is articulated to an arm provided internally of the flow passage, which arm is mounted for pivoting movement about the same axis as that of the lever.

9. A valve as claimed in claim 8, wherein said spring comprises a part of a spring-loaded toggle mechanism interconnecting the lever and the arm, whereby movement of the lever through an over-center position of the toggle mechanism drives the valve plate to its closed position, the arm being free to move the valve plate to its closed position against the action of the spring of the toggle mechanism under excessive flow conditions.

10. A valve as claimed in claim 5, wherein there is a second spring which urges the lever to a second position where the valve is closed, the lever being held in a first position where the valve member is free to move between its open and closed positions by a release mechanism which frees the lever should the valve body break at its weakened zone.

11. A valve as claimed in claim 10, wherein the release mechanism includes a frangible link is mounted on the valve body to span the weakened zone, the lever bearing on the frangible link in its first position and being released to move to its second position upon the link breaking.

12. A valve as claimed in claim 11, wherein the frangible link comprises a glass bar or tube spanning the weakened zone and which is clamped to the body each side of said zone.

13. A valve as claimed in claim 1, wherein there is a second valve seat provided within the flow passage on the other side of the weakened zone with respect to the first-mentioned valve seat, there being a second valve member mounted to co-operate with the second valve seat.

14. A valve as claimed in claim 13, wherein the second valve member is spring-urged to engage the second seat so as thereby to form a non-return valve which closes under no-flow or reverse flow conditions, having regard to the normal flow direction through the valve.

15. A valve as claimed in claim 7, wherein there is a second spring which urges the lever to a second position where the valve is closed, the lever being held in a first position where the valve member is free to move between its open and closed positions by a release mechanism which frees the lever should the valve body break at its weakened zone.

16. A valve as claimed in claim 10, wherein there is a second valve seat provided within the flow passage on the other side of the weakened zone with respect to the first-mentioned valve seat, there being a second valve member mounted to co-operate with the second valve seat.

17. A valve as claimed in claim 16, wherein the second valve member is spring-urged to engage the second seat so as thereby to form a non-return valve which closes under no-flow or reverse flow conditions, having regard to the normal flow direction through the valve.

* * * * *